(12) United States Patent
Xiang et al.

(10) Patent No.: US 11,269,713 B2
(45) Date of Patent: Mar. 8, 2022

(54) DATA OBTAINING METHOD AND APPARATUS

(71) Applicant: Hangzhou Hikvision Digital Technology Co., Ltd., Hangzhou (CN)

(72) Inventors: Yang Xiang, Hangzhou (CN); Jie Wang, Hangzhou (CN); Jie Yan, Hangzhou (CN); Qi Wu, Hangzhou (CN); Yongheng Yu, Hangzhou (CN); Ming Chen, Hangzhou (CN); Yang Luo, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/057,013

(22) PCT Filed: Apr. 4, 2019

(86) PCT No.: PCT/CN2019/081474
§ 371 (c)(1),
(2) Date: Nov. 19, 2020

(87) PCT Pub. No.: WO2019/223432
PCT Pub. Date: Nov. 28, 2019

(65) Prior Publication Data
US 2021/0191800 A1 Jun. 24, 2021

(30) Foreign Application Priority Data
May 22, 2018 (CN) .......................... 201810496123.7

(51) Int. Cl.
*G06F 11/00* (2006.01)
*G06F 11/07* (2006.01)
*G06F 12/06* (2006.01)

(52) U.S. Cl.
CPC ........ *G06F 11/079* (2013.01); *G06F 11/0727* (2013.01); *G06F 11/0751* (2013.01); *G06F 12/06* (2013.01)

(58) Field of Classification Search
CPC ............. G06F 11/1076; G06F 11/1084; G06F 11/1088; G06F 11/1092; G06F 11/2053;
(Continued)

(56) References Cited

U.S. PATENT DOCUMENTS 6,112,319 A * 8/2000 Paulson ................ G06F 11/073
710/54
7,653,840 B1 * 1/2010 Taylor ................. G06F 11/0727
714/47.2
(Continued)

FOREIGN PATENT DOCUMENTS

CN 101526907 9/2009
CN 102063273 5/2011
(Continued)

OTHER PUBLICATIONS

International Search Report and Written Opinion issued in Corresponding PCT Application No. PCT/CN2019/081474, dated Jul. 4, 2019 (English Translation provided).
(Continued)

*Primary Examiner* — Sarai E Butler
(74) *Attorney, Agent, or Firm* — Norton Rose Fulbright US LLP

(57) ABSTRACT

A data obtaining method and apparatus. The method comprises: determining address information of data to be obtained; judging whether a disk corresponding to the address information of the data to be obtained is a damaged disk or not; if the disk corresponding to the address information of the data to be obtained is not a damaged disk, obtaining the data to be obtained according to the address
(Continued)

information of the data to be obtained to obtain current data; if the disk corresponding to the address information of the data to be obtained is a damaged disk, determining the address information of next data to be obtained, and returning to the step of judging whether a disk corresponding to the address information of the data to be obtained is a damaged disk or not.

19 Claims, 3 Drawing Sheets

(58) Field of Classification Search
CPC .. G06F 11/2056; G06F 11/008; G06F 11/079; G06F 11/3409; G06F 11/3452; G06F 11/3604; G06F 12/06; G06F 12/1425; G06F 11/0727; G06F 11/0751; G06F 11/14; G06F 11/1489; G06F 3/064; H04N 21/00
USPC .................................................. 714/1–57
See application file for complete search history.

(56) References Cited

U.S. PATENT DOCUMENTS

| | | | |
|---|---|---|---|
| 7,743,284 B1* | 6/2010 | Taylor | G06F 11/0775 714/42 |
| 2003/0016596 A1 | 1/2003 | Chiquoine et al. | |
| 2003/0191982 A1* | 10/2003 | Arakawa | G11B 20/1883 714/6.13 |
| 2005/0283657 A1* | 12/2005 | Nishihara | G11C 29/76 714/6.13 |
| 2009/0327840 A1* | 12/2009 | Moshayedi | G06F 3/0688 714/773 |
| 2011/0219259 A1* | 9/2011 | Frost | G06F 11/1469 714/6.2 |
| 2012/0072776 A1* | 3/2012 | Ng | G06F 11/3688 714/38.1 |
| 2013/0212440 A1* | 8/2013 | Rom | G06F 11/3072 714/47.1 |
| 2015/0220398 A1* | 8/2015 | Schirripa | G06F 3/0644 707/675 |
| 2016/0179644 A1* | 6/2016 | Wu | G06F 3/0619 714/6.22 |
| 2016/0342380 A1* | 11/2016 | Greene | H04N 21/439 |
| 2017/0123733 A1 | 5/2017 | Cohen | |
| 2018/0262763 A1* | 9/2018 | Seregin | H04N 19/619 |

FOREIGN PATENT DOCUMENTS

| | | |
|---|---|---|
| CN | 103605479 | 2/2014 |
| CN | 103729275 | 4/2014 |
| CN | 103970487 | 8/2014 |
| CN | 104007936 | 8/2014 |
| CN | 203950299 | 11/2014 |
| CN | 104866239 | 8/2015 |
| CN | 107992430 | 5/2018 |

OTHER PUBLICATIONS

Office Action issued in Corresponding Chinese Application No. 201810496123.7, dated Aug. 18, 2021 (English Translation provided).

* cited by examiner

DATA OBTAINING METHOD AND APPARATUS

CROSS REFERENCE TO RELATED APPLICATIONS

The present application is a national phase application under 35 U.S.C. § 371 of International Application No. PCT/CN2019/081474, filed Apr. 4, 2019, which claims the benefit of priority to Chinese patent application No. 201810496123.7, filed with the China National Intellectual Property Administration on May 22, 2018 and entitled "Data Obtaining method and apparatus", each of which are incorporated herein by reference in their entirety.

TECHNICAL FIELD

This application relates to the field of data processing technology, and in particular to a data obtaining method and apparatus.

BACKGROUND

With the development of computer technology, the amount of data that needs to be stored increases geometrically. In order to improve the storage performance of data storage, a currently common storage mode is a Redundant Array of Independent Disks (RAID) mode. In the RAID mode, a large number of disks are combined into a disk array with a large capacity, and when data is stored, the data is cut into many data blocks, which are stored in respective disks. Parity blocks obtained by logical operation on each data block and the data blocks form a stripe together, for example, the stripe can include n data blocks and m parity blocks. Since the above logical operation relationship exists between the data blocks and the parity blocks in the stripe, no less than n data blocks or parity blocks can be arbitrarily selected from the stripe, and other data blocks or parity blocks in the stripe can be obtained according to the logical operation relationship. Each data block and parity block are distributed on different disks.

When there are less than or equal to m disks damaged, this situation belongs to redundant bad disks, and the disk array is in a usable state. In this case, for each stripe, the data of the stripe on the undamaged disk can be used to recover the data of the stripe on the damaged disk. For example, in a 4+1 stripe storage mode (n=4, m=1), when there is 1 disk that is damaged, the remaining 4 disks may be used to recover the data on the damaged disk, and the recovered data may be moved to the new disk again.

However, when there are more than m disks that are damaged, the data of the stripe on the damaged disk cannot be recovered using the data of the stripe on the undamaged disk. This situation belongs to ultra-redundant bad disks, and the disk array is in an unusable state, and all data in the disk array cannot be obtained. For users, the undamaged data in the disk array may also be very important. Users have the requirement to obtain this part of the data.

SUMMARY

An embodiment of this application aims to provide a data obtaining method and apparatus so as to obtain undamaged data in a disk array when an ultra-redundant bad disk occurs.

In order to achieve the above object, the embodiment of this application provides a data obtaining method, including:
determining address information of data to be obtained;
judging whether a disk corresponding to the address information of the data to be obtained is a damaged disk or not;
if the disk corresponding to the address information of the data to be obtained does is not a damaged disk, obtaining the data to be obtained according to the address information of the data to be obtained to obtain current data;
if the disk corresponding to the address information of the data to be obtained is a damaged disk, determining address information of the next data to be obtained, and returning to the step of judging whether a disk corresponding to the address information of the data to be obtained is a damaged disk or not.

Optionally, when the data to be obtained includes at least one data block, the step of obtaining the data to be obtained according to the address information of the data to be obtained includes:
obtaining the data block corresponding to the address information of the data to be obtained as current data.

Optionally, the step of judging whether a disk corresponding to the address information of the data to be obtained is a damaged disk or not includes:
determining a physical address mapped by the address information of the data to be obtained, judging whether the physical address is an address on the damaged disk or not, and if the physical address is an address on the damaged disk, determining that the disk corresponding to the address information of the data to be obtained is a damaged disk.

Optionally, the data to be obtained is video data; after obtaining the current data, the method further includes:
playing the current data.

Optionally, the step of playing the current data includes:
adding the current data into data to be played;
playing an I-frame when the data to be played includes the I-frame;
playing the I-frame and other frames that need to be analyzed depending on the I-frame when the data to be played includes the I-frame and the other frames.

Optionally, the step of determining address information of data to be obtained includes:
determining address information of data to be obtained in the unit of complete GOP of video data.
the step of playing the current data includes:
playing an I-frame when the current data includes the I-frame;
playing the I-frame and other frames that need to be analyzed depending on the I-frame when the current data includes the I-frame and the other frames.

Optionally, the data to be obtained includes at least one data block; when the data to be obtained is video data, the data amount of the data block is: N times or 1/N the size of the complete GOP of the video data corresponding to the data to be obtained, wherein N is a positive integer.

Optionally, when it is detected that there are more than a preset specified number of damaged disks, the method further includes:
obtaining the number of undamaged disks, and determining the first stripe storage mode according to the number of the undamaged disks; the first stripe storage mode is different from the second stripe storage mode, and the second stripe storage mode is a storage mode adopted when no damaged disk is detected;
storing the data to be stored to the undamaged disks according to the first stripe storage mode when the data to be stored is obtained.

Optionally, the step of storing data to be stored to the undamaged disks according to the first stripe storage mode includes:

determining address information of the data to be stored according to the first stripe storage mode;

judging whether a disk corresponding to the address information of the data to be stored belongs to the undamaged disks or not;

if the disk corresponding to the address information of the data to be stored belongs to the undamaged disks, storing the data to be stored according to the address information of the data to be stored;

if the disk corresponding to the address information of the data to be stored is not the undamaged disks, re-determining the address information of the data to be stored, and returning to execute the step of judging whether the disk corresponding to the address information of the data to be stored belongs to the undamaged disks or not.

Optionally, the step of determining a first stripe storage mode according to the number of the undamaged disks includes:

determining the first stripe storage mode with redundancy protection when the number of the undamaged disks is larger than a preset number threshold, determining the first stripe storage mode without redundancy protection when the number of the undamaged disks is not larger than the preset number threshold.

Optionally, the data to be stored includes at least one data block; when the data to be stored is video data, the data amount of the data block is: N times or 1/N of the size of the complete GOP of the video data corresponding to the data to be stored, wherein N is a positive integer.

An embodiment of this application further provides a data obtaining apparatus, including:

a determining module for determining address information of data to be obtained;

a judging module for judging whether the disk corresponding to the address information of the data to be obtained is a damaged disk or not;

an obtaining module for obtaining the data to be obtained according to the address information of the data to be obtained to obtain current data when the disk corresponding to the address information of the data to be obtained is not a damaged disk;

the determining module is further used to determine address information of next data to be obtained and trigger the judging module when the disk corresponding to the address information of the data to be obtained is a damaged disk.

Optionally, the data to be obtained is video data; the apparatus further includes:

a playing module is used for playing the current data after the current data is obtained.

Optionally, the playing module is specifically used for:

adding the current data into data to be played;

playing an I-frame when the data to be played includes the I-frame;

playing the I-frame and other frames that need to be analyzed depending on the I-frame when the data to be played includes the I-frame and the other frames.

Optionally, the first determining module is specifically used for:

determining address information of data to be obtained in the unit of complete GOP of video data;

the playing module is specifically used for:

playing an I-frame when the current data includes the I-frame;

playing the I-frame and other frames that need to be analyzed depending on the I-frame when the current data includes the I-frames and the other frames.

Optionally, the data to be obtained includes at least one data block; when the data to be obtained is video data, the data amount of the data block is: N times or 1/N the size of the complete GOP of the video data corresponding to the data to be obtained, wherein N is a positive integer.

Optionally, the apparatus further includes: a storage module;

the obtaining module is further used for obtaining the number of undamaged disks when it is detected that there are more than a preset specified number of damaged disks;

the determining module is further used to determine the first stripe storage mode according to the number of the undamaged disks; the first stripe storage mode is different from the second stripe storage mode, and the second stripe storage mode is a storage mode adopted when no damaged disk is detected;

the storage module is used for storing data to be stored to the undamaged disks according to the first stripe storage mode when the data to be stored is obtained.

Optionally, the storage module is specifically used for:

determining address information of the data to be stored according to the first stripe storage mode;

judging whether a disk corresponding to the address information of the data to be stored belongs to the undamaged disks or not;

if the disk corresponding to the address information of the data to be stored belongs to the undamaged disks, storing the data to be stored according to the address information of the data to be stored;

if the disk corresponding to the address information of the data to be stored is not the undamaged disks, re-determining the address information of the data to be stored, and judging whether the disk corresponding to the address information of the data to be stored belongs to the undamaged disks or not.

An embodiment of this application also provides an electronic device which includes a processor, a communication interface, a memory and a communication bus, wherein the processor, the communication interface and the memory communicate with each other through the communication bus;

the memory is used for storing a computer program;

the processor is used for implementing the data obtaining method according to the embodiment of this application when executing the program stored in the memory. The method includes:

determining address information of data to be obtained;

judging whether the disk corresponding to the address information of the data to be obtained is the damaged disk or not;

if the disk corresponding to the address information of the data to be obtained is not a damaged disk, obtaining the data to be obtained according to the address information of the data to be obtained to obtain current data;

if the disk corresponding to the address information of the data to be obtained is a damaged disk, determining address information of the next data to be obtained, and returning to the step of judging whether a disk corresponding to the address information of the data to be obtained is a damaged disk or not.

An embodiment of this application further provides a computer-readable storage medium, in which a computer program is stored, and when the computer program is executed by a processor, the computer program implements the data obtaining method according to the embodiment of this application. The method includes:

determining address information of data to be obtained;

judging whether the disk corresponding to the address information of the data to be obtained is a damaged disk or not;

if the disk corresponding to the address information of the data to be obtained is not a damaged disk, obtaining the data to be obtained according to the address information of the data to be obtained to obtain current data;

if the disk corresponding to the address information of the data to be obtained is a damaged disk, determining address information of the next data to be obtained, and returning to the step of judging whether a disk corresponding to the address information of the data to be obtained is a damaged disk or not.

An embodiment of this application further provide an executable program code, where the executable program code is configured to be executed to perform any one of the above data obtaining methods.

The data obtaining method and apparatus according to the embodiments of this application can determine whether the data to be obtained is stored in the damaged disk or the undamaged disk according to the decision result of if the disk corresponding to the address information of the data to be obtained is the damaged disk. When the ultra-redundant bad disk occurs, the data on the damaged disk is damaged and cannot be obtained, and the data on the undamaged disk is still intact. When the data to be obtained is stored in the undamaged disk, the data to be obtained can be obtained according to the address information of the data to be obtained, and then the undamaged data in the disk array can be obtained when the ultra-redundant bad disk occurs.

BRIEF DESCRIPTION OF THE DRAWINGS

In order to more clearly explain the technical solution in the embodiment of this application and the prior art, the following will briefly introduce the drawings that need to be used in the description of the embodiments and the prior art. It is obvious that the drawings described below are only some embodiments of the present application. For those skilled in the art, other drawings can be obtained according to the drawings without paying creative work.

DETAILED DESCRIPTION

In order to make the objects, technical solutions and advantages of the present application more clearer, the present application is further described in detail below with reference to the drawings and examples. Obviously, the described embodiments are only a part of the embodiments of the present application, not all the embodiments. Based on the embodiment of the present application, all other embodiments obtained by ordinary technical personnel in the art without creative work shall fall within the protection scope of the present application.

In a Redundant Array of Independent Disks (RAID) storage mode, a large number of disks are combined into a disk array with a large capacity, and when data is stored, the data is cut into many data blocks, which are stored in respective disks. Parity blocks obtained by logical operation on each data block and the data blocks form a stripe together, for example, the stripe can include n data blocks and m parity blocks, n is not less than m, and n and m are integers. Since the above logical operation relationship exists between the data blocks and the parity blocks in the stripe, no less than n data blocks or parity blocks can be arbitrarily selected from the stripe, and other data blocks or parity blocks in the stripe can be obtained according to the logical operation relationship. Each data block and parity block are distributed on different disks.

When there are less than or equal to m disks damaged, this situation belongs to redundant bad disks, and the disk array is in a usable state. In this case, for each stripe, the data of the stripe on the undamaged disk can be used to recover the data of the stripe on the damaged disk. For example, in the 4+1 stripe storage mode (n=4, m=1), when 1 disk is damaged, the remaining 4 disks can be used to recover the data on the damaged disk and move the recovered data to the new disk.

When there are more than m disks that are damaged, the data of the stripe on the damaged disk cannot be recovered using the data of the stripe on the undamaged disk. This situation belongs to ultra-redundant bad disks, and the disk array is in an unusable state, and all data in the disk array cannot be obtained. For users, the undamaged data in the disk array may also be very important. Users have the requirement to obtain this part of the data.

In order to obtain undamaged data when an ultra-redundant bad disk occurs, the embodiments of the present application provide a data obtaining and storage method and apparatus. The following describes the data obtaining method according to the present application in detail through specific embodiments.

Figure 1:
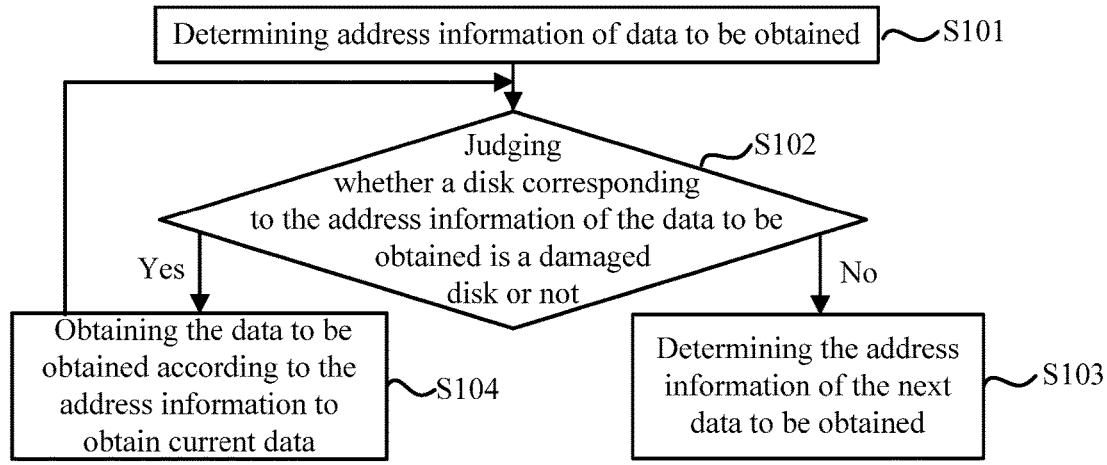
FIG. 1 is a schematic flowchart of a data obtaining method according to an embodiment of the present application.

FIG. 1 is a schematic flowchart of a data obtaining method according to an embodiment of the present disclosure. The method is applied to an electronic device. The electronic device may be a device having a computing processing function.

In an application scenario of this embodiment, disk arrays for storing data are located inside an electronic device.

In another application scenario, disk arrays for storing data are located outside of an electronic device. The electronic device can be a management device in a distributed storage system, and the disk arrays are respectively located inside the storage devices in the distributed storage system. The distributed storage system can include one or more storage devices.

The embodiment includes the following steps S101 to S104:

Step S101: determining address information of data to be obtained.

An electronic device can determine the address information of the data to be obtained according to a data obtaining request when receiving the data obtaining request sent by other devices. Alternatively, the electronic device determines the address information of the data to be obtained according to a data obtaining instruction when receiving the data obtaining instruction.

For ease of description, the data stored in the storage space pointed to by the address information determined in S101 is called the data to be obtained.

The address information may be understood as a logical address. The logical address is also called relative address, and an actual effective address in the memory, i.e. a physical address, can be obtained after the logical address is calculated or converted by an addressing mode. The physical address is also called a real address or an absolute address. The address information may be expressed in terms of a start address of data to be obtained and a data amount of the data to be obtained.

Step S102: judging whether a disk corresponding to the address information of the data to be obtained is a damaged disk or not, if not, executing a step S103; if so, executing a step S104.

In specific implementation, this step can be determining a physical address mapped by the address information of the data to be obtained, judging whether the physical address is an address on a damaged disk, and if so, determining that a disk corresponding to the address information of the data to be obtained is the damaged disk.

The physical address mapped by the address information of the data to be obtained can be determined by using a method in the related art, and this embodiment will not be described in detail.

For example, the electronic device includes 5 disks, each having a storage capacity of 1 T. The known physical address ranges of the disk 1 to the disk 5 are respectively as follows: 0-1 T, 1 T-2 T, 2 T-3 T, 3 T-4 T, 4 T-5 T. When the disk 4 and the disk 5 are damaged, the physical addresses 3 T-5 T are addresses on the damaged disk, and when the physical addresses are between 3 T-5 T, it can be determined that the disk corresponding to the address information is the damaged disk.

When the disk corresponding to the address information of the data to be obtained is the damaged disk, the data to be obtained corresponding to the address information is considered to be damaged and cannot be obtained, and the data to be obtained is the damaged data. When the disk corresponding to the address information of the data to be obtained is not the damaged disk, the data to be obtained corresponding to the address information is considered to be not damaged and can be obtained.

In an embodiment, when it is detected that there are more than a preset specified number of damaged disks, it can be judged whether the disk corresponding to the address information of the data to be obtained is a damaged disk or not. The specified number can be determined based on the number of disks in the disk array to which the electronic device is connected and the stripe storage mode. The stripe storage mode can be understood as a storage mode including information of the number of data blocks and parity blocks in the stripe. An ultra-redundant bad disk occurs when there are more than the specified number of disks damaged. For example, when 4, 5, or 6 disks are included in the disk array, the stripe storage mode can be a 3+1, 4+1, or 5+1 storage mode, respectively, and the specified number can be set to 1. An ultra-redundant bad disk occurs when there are 2 and more than 2 disks damaged. At this time, the data obtaining method according to the embodiment of the present application can be used to obtain the undamaged data.

When the number of the damaged disks is smaller than or equal to the specified number, the data obtaining method according to the embodiment of the application can be used for obtaining the undamaged data.

Step S103: obtaining the data to be obtained according to the address information of the data to be obtained to obtain current data.

When obtaining the data to be obtained, the data to be obtained can be obtained from a storage space to which a physical address mapped by the address information of the data to be obtained points.

When the disk array is located inside the electronic device, the data to be obtained can be directly obtained from the inside of the electronic device according to the address information.

In the distributed storage system, the electronic device can obtain the data to be obtained from the storage device according to the address information of the data to be obtained.

The obtained current data can be all of the data to be obtained, or can be a part of the data to be obtained. As will be described later, when the data to be obtained is obtained based on the address information of the data to be obtained, the complete data to be obtained may not be obtained, and therefore, in order to distinguish the description, the data obtained based on the address information determined in S101 is referred to as current data.

Step S104: determining address information of next data to be obtained, and returning to execute the step S102.

When the data to be obtained is stored in the damaged disk, the data to be obtained cannot be obtained, and at this time, the data to be obtained is not obtained any more, and the address information of the next data to be obtained can be determined continuously, and the next data to be obtained is obtained.

When determining the address information of the next data to be obtained, the specific embodiment can refer to the description of determining the address information of the data to be obtained in step S101, and details are not repeated here.

As can be seen from the above, in this embodiment, it may be determined whether the data to be obtained is stored in the damaged disk or stored in the undamaged disk according to a decision result of if a disk corresponding to the address information of the data to be obtained is a damaged disk. When the ultra-redundant bad disk occurs, the data on the damaged disk is damaged and cannot be obtained, and the data on the undamaged disk is still intact. When the data to be obtained is stored in the undamaged disk, the data to be obtained can be obtained according to the address information, and further the undamaged data in the disk array can be obtained when the ultra-redundant damaged disk occurs.

In another embodiment of the present application, when the data to be obtained includes at least one data block (CHUNK) data, when the address information of the data to be obtained is determined in step S101, the determined address information of the data to be obtained includes the address information of the data of each data block in the data to be obtained. The data to be obtained can include one or more data blocks.

For example, if the data amount of the data to be obtained is 256 kB and the data amount of each data block is 64 kB, the data to be obtained includes 4 data blocks. The address information of the data to be obtained includes: starting address 0+data amount 256 kB, so that it can be known that the address information of each data block in the data to be obtained can be 0+63 kB, 64+63 kB, 128+63 kB, and 192+63 kB, respectively.

In step S102, for each data block in the data to be obtained, it can be judged whether the disk corresponding to the address information of a data block is a damaged disk or not. Alternatively it can also be judged as a whole whether the disk corresponding to the address information of the data to be obtained is the damaged disk or not, in this case, if it is judged as a whole that the disk corresponding to the address information of the data to be obtained is not a damaged disk, it may also be possible that a part of the data blocks in the data to be obtained is a damaged disk.

Step S103, obtaining the data to be obtained according to the address information of the data to be obtained can include obtaining the data block corresponding to the address information of the data to be obtained as the current data.

As described above, in some cases, even if the decision result in S102 is no (judge as a whole that the disk corresponding to the address information of the data to be obtained is not a damaged disk), a part of the data block in the data to be obtained may be a damaged disk. That is, in S103, when the data to be obtained is obtained according to the address information of the data to be obtained, the complete data to be obtained may not be obtained, and therefore, in order to distinguish descriptions, the data obtained according to the address information determined in S101 is referred to as current data.

The current data can be the data of all data blocks of the data to be obtained, or can be the data of a part of data blocks in the data to be obtained. When the data of a part of data blocks in the data to be obtained are stored in the damaged disk and the data of other data blocks are stored in the undamaged disk, the data of other data blocks stored in the undamaged disk can be obtained.

And when the disk corresponding to the address information of a part of data blocks in the data to be obtained is the undamaged disk, obtaining the data of a part of data blocks according to the address information, wherein only the data of a part of data blocks in the data to be obtained can be obtained under the condition. If the disk corresponding to the address information of the other data blocks in the data to be obtained is the damaged disk, the data of other data blocks cannot be obtained.

Figure 2A:
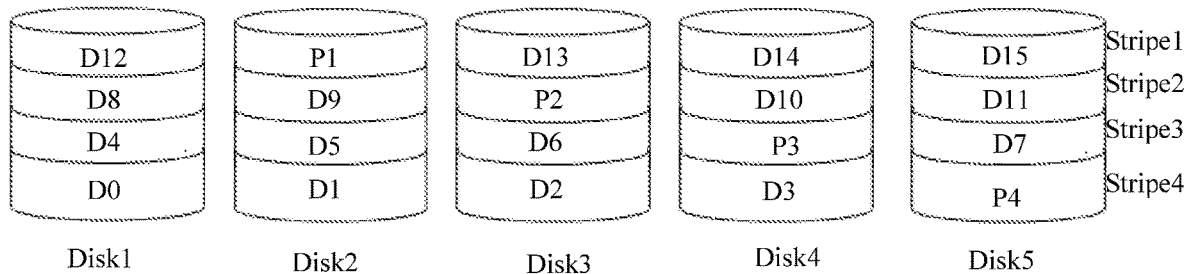
FIG. 2a is a schematic diagram of a disk array according to an embodiment of the present application.

For example, FIG. 2a is a schematic diagram of a disk array according to an embodiment of the present application. FIG. 2 includes 5 disks, stripes are in a 4+1 mode, 4 data blocks and 1 parity block in each stripe are respectively located on different disks, D in FIG. 2 represents a data block, and P represents a parity block. When there are 2 damaged disks, such as disk 4 and disk 5, if the data to be obtained includes D0, D1, D2 and D3 in the stripe 4, since D0, D1 and D2 are stored in disk 1, disk 2 and disk 3 respectively, the data in D0, D1 and D2 can be obtained. Since D3 is stored in disk 4, the data in D3 cannot be obtained.

Step S104, when the address information of the next data to be obtained is determined, the determined address information includes the address information of the data block included in the next data to be obtained.

To sum up, in this embodiment, the data to be obtained can include one or more data blocks, and when obtaining the data to be obtained, the data can be obtained according to the data blocks, through which the data on the undamaged disk can be more accurately obtained.

In the embodiment of FIG. 1, obtaining the address information to be processed; judging whether the disk pointed by the address information to be processed is a damaged disk or not; and if not, obtaining data as the current data according to the address information to be processed.

In one case, if the disk pointed by the address information to be processed is a damaged disk, the next address information to be processed can be continuously obtained, and the step of judging whether the disk pointed by the address information to be processed is a damaged disk can be continuously performed.

In one case, the address information of data of multiple data blocks can be included in the address information to be processed. In this case, the following processing can be performed for each data block: judging whether the disk corresponding to the address information of the data block is a damaged disk or not, if the disk corresponding to the address information of the data block is not a damaged disk, obtaining the data block according to the address information of the data block, if the disk corresponding to the address information of the data block is a damaged disk, continuously determining the address information of the next data block, and continuously judging whether the disk corresponding to the address information of the next data block is the damaged disk or not.

Alternatively, it can also be determined whether the disk corresponding to the address information to be processed is a damaged disk or not as a whole. In this case, if it is judged that the disk corresponding to the address information to be processed is not a damaged disk as a whole, some of the data blocks in the data to be obtained may also be a damaged disk. That is to say, when data is obtained according to the address information to be processed, complete data may not be obtained, and for ease of description, the data obtained according to the address information to be processed is referred to as current data. The current data may be all data in the storage space pointed to by the address information to be processed, or may be partial data in the storage space pointed to by the address information to be processed.

When the data stored in the disk array is video data, such as surveillance video or recording video, etc., and an ultra-redundant bad disk occurs, it may be very important for the user that the video data in the disk is not damaged. The user not only needs to obtain the video data in the undamaged disk, but may also need to play back this portion of the video data. Accordingly, the present application also provides the following embodiments.

Figure 3:
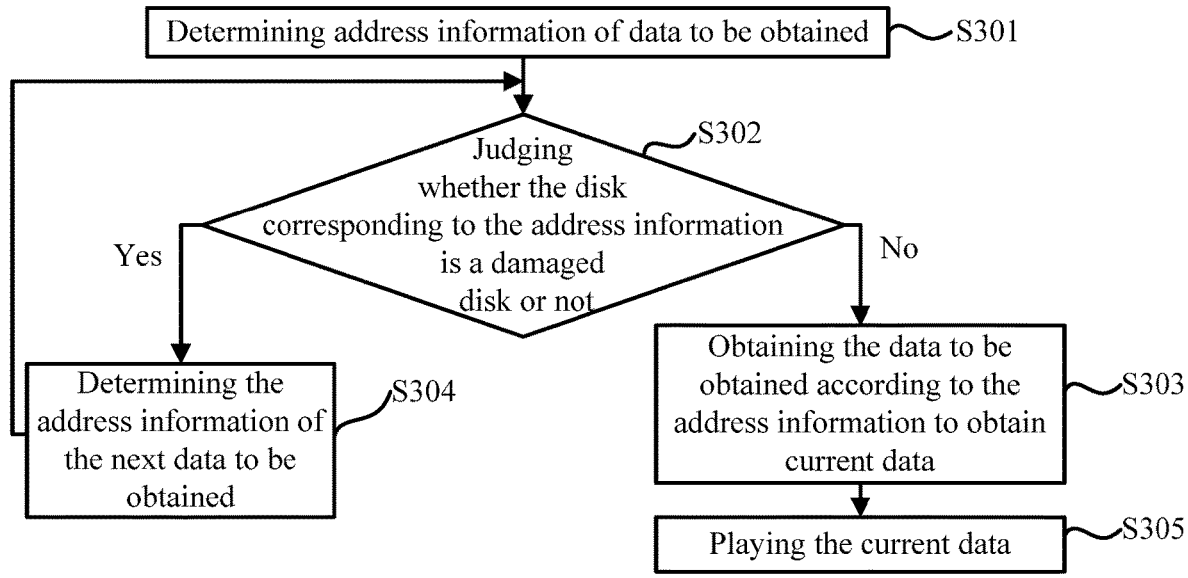
FIG. 3 is another schematic flowchart of a data obtaining method according to an embodiment of the present application.

In another embodiment of the present application, when the data to be obtained is video data, the embodiment shown in FIG. 3 can be obtained on the basis of the embodiment shown in FIG. 1. FIG. 3 is another schematic structural diagram of a data obtaining method according to an embodiment of the present application. The execution main body and the application scenario of the present solution can be the same as those of the embodiment shown in FIG. 1, and are not described herein again. The present embodiment includes the following steps S301 to S305:

Step S301: determining address information of data to be obtained.

Step S302: judging whether the disk corresponding to the address information of the data to be obtained is a damaged disk or not, if the disk corresponding to the address information of the data to be obtained is not a damaged disk, executing a step S303; if the disk corresponding to the address information of the data to be obtained is a damaged disk, executing a step S304.

Step S303: obtaining the data to be obtained according to the address information of the data to be obtained to obtain current data.

Step S304: determining the address information of the next data to be obtained, and returning to execute the step S302.

Step S305: playing the current data after obtaining the current data.

Since video data is composed of a plurality of Groups Of Pictures (GOPs), the Group Of Pictures include an I-frame and other frames including P-frames and B-frames. The I-frame is a key frame in the video. The analysis of P-frames and B-frames depends on the I-frame. The GOP can be understood as groups including one I-frame and all other frames depending on the I-frame. When an I-frame is configured every n frames in video data, a GOP is a group including n frames. For example, if an I-frame is configured for every 50 frames in video data of a 2M stream, the data amount of each complete GOP data is 512 kB, that is, 2 s of video data.

When an I-frame is obtained, or an I-frame and other frames which are analyzed depending on the I-frame are obtained, the I-frame or the I-frame and other frames which are analyzed depending on the I-frame can be played.

In this step, when playing the current data, the following implementation manner may be adopted:

adding the current data into the data to be played, and playing the I-frame when the data to be played includes the I-frame; and when the data to be played includes the I-frame and other frames which are analyzed depending on the I-frame, playing the I-frame and the other frames.

Before adding the current data into the data to be played, the data to be played can have or not have the data obtained last time.

For example, when the data to be obtained is not data in the unit of complete GOP of video data, such as the data to be obtained is a part of a complete GOP, the data to be played may have the data obtained last time before adding the current data to the data to be played. When the data to be obtained is data in the unit of complete GOP of video data, for example, the data to be obtained is a complete GOP, the data to be played may not have the data obtained last time before adding the current data to the data to be played.

When the data to be obtained is incomplete GOP data, the current data can be played in the manner of this embodiment. The data to be obtained is one-M of the complete GOP data, wherein M is a positive integer, or the data to be obtained is the complete GOP data plus one-M of the complete GOP data. For example, when the data to be obtained is half of the complete GOP data, or the data to be obtained is one or more of the complete GOP data plus part of the GOP data, the current data can be played by using the embodiment.

When there is data that has not been played for a long time in the data to be played, a part of the data that has not been played for a long time can be discarded. The part of data may be fragmented data in the complete GOP data, and data other than the part of data in the complete GOP data may be stored on the damaged disk and cannot be obtained, so that the part of data may be discarded.

When the data to be obtained is at least one complete GOP data of the video data, the current data can also be played in the manner of this embodiment, or the current data can also be played in the manner of the following embodiment.

In another embodiment of the present application, the step of determining the address information of the data to be obtained can include:

determining address information of data to be obtained in the unit of complete GOP of video data.

Step S305, the step of playing the current data can include:

When the current data includes an I-frame, playing the I-frame; when the current data includes the I-frame and other frames which are analyzed depending on the I-frame, the I-frame and other frames are played.

The part of data in the current data other than the complete GOP data can be discarded.

For example, the data to be obtained includes 2 complete GOP data, and the current data includes one complete GOP data data1 and one incomplete GOP data data2. When playing the obtained data (the current data), data1 can be played. For incomplete GOP data2, when I-frame is missing in the incomplete GOP data, all frames of the data2 cannot be played, and in this case, the data2 can be discarded; when I-frame still exists in the incomplete GOP data and a part of B-frames are missing, data2 can be played in this case.

The incomplete GOP data can be the data missing I-frame or a part of P-frames, or a part of B-frames in complete GOP data.

To sum up, in this embodiment, when the video data is stored in the disk array, under the condition that the disk array has an ultra-redundant bad disk, the video data can be obtained from the undamaged disk, the current data can be obtained, and the current data can be played for the user to view, so as to meet the requirement of the user for viewing the undamaged video data.

In another embodiment of the present application, in the embodiment shown in FIG. 3, the data to be obtained includes at least one data block, and when the data to be obtained is video data, the data amount of the data block is: N times or 1/N of the size of the complete GOP of the video data corresponding to the data to be obtained, wherein N is a positive integer. For example, N can take the value of 1, 2, 3, or 4.

When the data amount of the data block is 1/N of the size of the complete GOP of the video data corresponding to the data to be obtained, each complete GOP data can be stored in continuous data blocks. The contiguous data blocks can be understood as contiguous data blocks in the same stripe, and can also be understood as contiguous data blocks in contiguous stripes. A contiguous data block means that the logical addresses of the respective data blocks are contiguous.

When the data amount of the data block is N times of the size of the complete GOP of the video data corresponding to the data to be obtained, each data block contains complete GOP data. In this case, the data block on the undamaged disk can be played, that is, all the data in the current data can be played.

When the data amount of the data block is 1/N of the size of the complete GOP of the video data corresponding to the data to be obtained, since one complete GOP data is distributed in N contiguous data blocks, the possibility that all data blocks in the N contiguous data blocks are distributed on an undamaged disk is increased, so that the data amount of playable data in the obtained data can be increased.

For example, for video data of a 2M code stream, if one I-frame is configured every 50 frames, the data amount of each complete GOP data is 512 kB, that is, 2 s of video data. When the data amount of the data block is 512 kB, each data block contains complete GOP data, and all data in the current data can be played. When the data amount of the data block is 256 kB, the data in two contiguous data blocks constitute one complete GOP data.

In FIG. 2a, it is known that D0 and D1, D2 and D3, D4 and D5, D6 and D7, D8 and D9, D10 and D11, D12 and D13, and D14 and D15 respectively form a complete GOP data. When the disk 4 and the disk 5 are damaged, the data that can be obtained (i.e., the current data) includes data in the following data blocks: D0, D1, D2, D4, D5, D6, D8, D9, D12 and D13. The playable data in the current data includes data in the following data blocks: D0 and D1, D4 and D5, D8 and D9, D12 and D13; the data which cannot be played in the current data includes the data in the following data blocks: D2 and D6. The ratio of playable data and unplayable data to the obtained data is 80% and 20% respectively.

In the related art, in FIG. 2a, the groups of data blocks that form a complete GOP data block include: a group consisting of D0, D1 and D2; a group consisting of D3, D4 and D5; a group consisting of D6, D7 and D8; a group consisting of D9, D10 and D11; a group consisting of D12, D13 and D14. When the disk 4 and the disk 5 are damaged, the data that can be obtained (i.e., the current data) includes data in the following data blocks: D0, D1, D2, D4, D5, D6, D8, D9, D12 and D13. The data playable in the current data includes data in the following data blocks: D0, D1, D2 and D4. The data which cannot be played in the current data includes the data in the following data blocks: D5, D6, D8, D9, D12 and D13. The ratio of playable data and unplayable data to the current data is 40% and 60% respectively. As can be seen from the comparison of the above examples, the present embodiment can increase the ratio of the playable data to the current data, so as to increase the playable data amount.

In one case, each data block and parity block in a stripe can be stored on different disks. When an ultra-redundant bad disk occurs, the risk of losing the whole video can be reduced, and the continuity of the playable data can be improved as much as possible.

When each data block and parity block in the stripe are stored on different disks, the current data may be discontinuous when playing the current data, and a frame skipping phenomenon exists. The frame skipping phenomenon can be understood as the discontinuous transition of the picture when the video data is being played. The frame skipping interval can be large or small. The frame skipping interval can be understood as the time interval between discontinuous pictures.

The larger the data amount of the data block is, the larger the frame skipping interval during data playback is. The small the data amount of the data block is, the small the frame skipping interval during data playback is. Therefore, the data amount of the data block can be set according to user requirement.

To sum up, in this embodiment, by setting the data amount of the data block to be N times or 1/N of the size of the complete GOP of the video data corresponding to the data to be obtained, the data amount of the playable data in the current data can be increased. Meanwhile, the embodiment can distribute the lost data in different time periods by setting the data amount of the data block, so that part of the video data that can be played exist in different time periods. For example, for surveillance videos, compared with the continuous loss of whole video data (such as the loss of surveillance videos on two disks), the situation that some data can be played in different time periods can better meet the user's requirement for viewing the surveillance videos.

The present application will be described in detail with reference to specific examples.

Figure 2B:
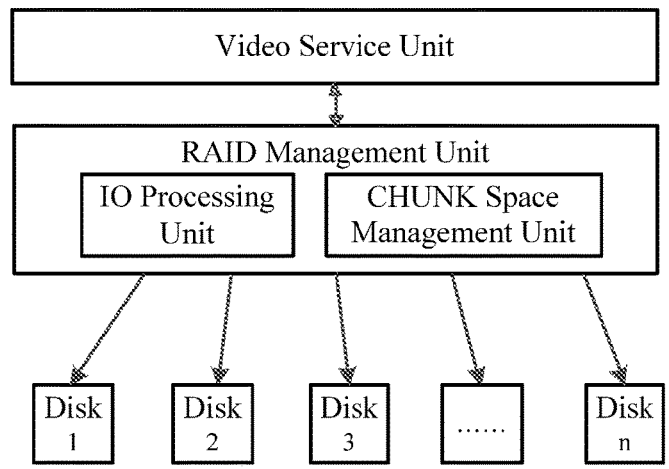
FIG. 2b is a schematic diagram of an internal structure of an electronic device according to an embodiment of the present application.

FIG. 2b is a schematic diagram of an internal structure of an electronic device according to an embodiment of the present disclosure. The video service unit is used for issuing, replaying and querying the video service. And the RAID management unit is used for providing a standard block device interface. The RAID management unit includes an IO processing unit and a CHUNK space management unit. And the IO processing unit is used for processing a read-write request of the video service unit to the data and can interact with the disks 1-$n$. The CHUNK space management unit is used for determining the physical address of the logical address mapping of the data block.

After determining the logical address of data block included in the data to be obtained, the video service unit sends a data obtaining request to the RAID management unit, where the data obtaining request carries the logical address of the data block. When the CHUNK space management unit in the RAID management unit receives the data obtaining request sent by the video service unit, it determines a physical address mapped by a logical address of each data block, judging whether a disk corresponding to the physical address is a damaged disk or not, and if a disk corresponding to the physical address is a damaged disk, returning an invalid message to the video service unit; and if a disk corresponding to the physical address is not a damaged disk, sending the physical address to the IO processing unit. And when receiving the physical address, the IO processing unit obtains corresponding data block from the disk corresponding to the physical address and sends the obtained data block to the video service unit.

When the video service unit receives the data block sent by the RAID management unit, the data block can be analyzed and played back.

When the video service unit receives the invalid message sent by the RAID management unit, the data block can be skipped over, and the next data to be obtained can be determined.

In the related art, when a ultra-redundant bad disk occurs in a disk array, the data cannot be stored in the undamaged disk. The storage space in the undamaged disk will be wasted. In order to fully utilize the storage space in the undamaged disk and improve the utilization rate of the disk when an ultra-redundant bad disk occurs, the application also provides a process for storing data into the undamaged disk as shown in FIG. 4.

Figure 4:
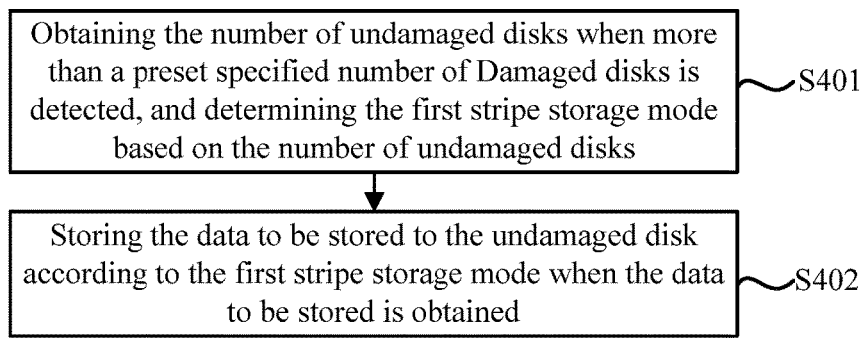
FIG. 4 is a schematic flowchart of a data storage process according to an embodiment of the present application.

In another embodiment of the present application, the embodiment shown in FIG. 1 can further include a data storage process in the flowchart shown in FIG. 4. The data storage process can be performed before, after, or in the middle of any of the steps of the data obtaining method of the embodiment shown in FIG. 1. The data storage process includes the following steps S401-S402:

Step S401: obtaining the number of undamaged disks when more than the preset specified number of disks is detected to be damaged, and determining the first stripe storage mode based on the number of undamaged disks.

The first stripe storage mode is different from the second stripe storage mode, and the second stripe storage mode is a storage mode adopted when no damaged disk is detected.

For example, when there is no damaged disk, the second stripe storage mode is 5+1. When two disks are damaged, the number of undamaged disks is 4, and the first stripe storage mode can be 3+1 or 4+0, etc. Wherein, in x+y, x is a data block, and y is a parity block.

When the disk damage occurs, the electronic device can obtain the number of the undamaged disks according to the detected damaged disks and the total number of disks in the preset disk array connected to the electronic device. For example, the total number of disks is 5, and when 2 damaged disks are detected, the number of undamaged disks is 5−2=3.

When the first stripe storage mode is determined based on the number of the undamaged disks, the first stripe storage mode corresponding to the number of the undamaged disks can be determined from a preset corresponding relationship between the number of the undamaged disks and the stripe storage mode.

For example, the preset correspondence relationship between the number of undamaged disks and the stripe storage mode can include: when there are 2 undamaged disks, the stripe storage mode is 2+0; when there are 3 undamaged disks, the stripe storage mode is 3+0; when there are 4 undamaged disks, the stripe storage mode is 3+1; when the undamaged disks are 5, the stripe storage mode is 5+1. When it is determined that the number of undamaged disks is 4, it can be determined that the first stripe storage mode is 3+1.

For another example, for an EC-RAID with the second stripe storage mode of 16+4, after 5 disks are damaged, 15 disks remain, and if a new redundant protection mode (the first stripe storage mode) is configured to be 14+1, data to be stored is written to the remaining disks in a manner of 14+1 during storage. In this way, not only can the service be continued, but also redundant protection can be provided to meet different user requirements.

In this embodiment, when more than a specified number of disks are damaged, ultra-redundant bad disks occur. At this time, the data storage process of the embodiment can be used to store the data to be stored to the undamaged disk. The specified number can be determined based on the number of disks in the disk array to which the electronic device is connected and the stripe storage mode.

Step S402: storing the data to be stored to the undamaged disk according to the first stripe storage mode when the data to be stored is obtained.

When the data to be stored is obtained, the electronic device can receive the data to be stored sent by other devices.

To sum up, in this embodiment, when an ultra-redundant bad disk is generated, the first stripe storage mode can be determined, and when the data to be stored is obtained, the data to be stored is stored according to the first stripe storage mode, and the data to be stored is stored on the undamaged disk, so that the storage space of the undamaged disk can be fully utilized.

In another embodiment of the present application, step S402 can be specifically performed according to the following embodiments shown in steps 1 to 4:

step 1: determining the address information of the data to be stored according to the first stripe storage mode.

The address information can be understood as a logical address. The address information can be expressed in a start address of data to be stored and a data amount of the data to be stored.

In the step of determining the address information of the data to be stored according to the first stripe storage mode, each data block in the same stripe can be determined from the data to be stored according to the number of data blocks of each stripe in the first stripe storage mode and the data amount of each data block, and the address information of each data block in the same stripe can be determined.

For example, the first stripe storage mode is 3+1, each stripe has 3 data blocks, each data block is 512 kB, and data amount of the data to be stored is 3072 kB, then six data blocks of block 1, block 2, block 3 to block 6 can be determined from the data to be stored. These 6 data blocks belong to 2 stripes, block 1 to block 3 belong to stripe 1, and block 4 to block 6 belong to stripe 2. When determining the logical addresses of the data blocks, the logical addresses of the data blocks belonging to the same stripe are contiguous, i.e. the logical addresses of blocks 1 to 3 are contiguous, and the logical addresses of blocks 4 to 6 are contiguous. The logical addresses of blocks 1 to 6 may be contiguous in order.

The address information of the data to be stored can be determined according to the last storage address of the stored data and the data amount of the data to be stored. Specifically, the last storage address of the stored data can be used as the start address of the data to be stored, and the address information of the data to be stored can be determined according to the data amount of the data to be stored.

For example, if the last storage address of the stored data is aa and the data amount of the data to be stored is 512 kB, the logical address of the data to be stored can be determined as: aa+511 kB.

Step 2: judging whether the disk corresponding to the address information of the data to be stored belongs to an undamaged disk or not, if the disk corresponding to the address information of the data to be stored is an undamaged disk, executing the step 3; if the disk corresponding to the address information of the data to be stored is not an undamaged disk, executing the step 4.

In specific implementation, this step can be to determining a physical storage address mapped by the address information of the data to be stored, judging whether the physical address is an address on the undamaged disk, and if the physical address is an address on the undamaged disk, determining that a disk corresponding to the address information belongs to the undamaged disk.

When determining the physical address mapped by the address information of the data to be stored, the physical address can be determined in a manner in the related art, and details of this embodiment are not described again.

When the disk corresponding to the address information of the data to be stored belongs to the undamaged disk, the data to be stored can be stored according to the address information; and when the disk corresponding to the address information does not belong to the undamaged disk, the data to be stored cannot be stored according to the address information.

Step 3: storing the data to be stored according to the address information of the data to be stored.

When storing the data to be stored, the data to be stored can be stored in the physical address mapped by the address information.

When the disk array is located in the electronic device, the data to be stored can be directly stored according to the address information.

In the distributed storage system, the electronic device can store the data to be stored in the disk of the storage device according to the address information.

Step 4: re-determining the address information of the data to be stored, and returning to execute the step 2.

When the address information points to the damaged disk, the data to be stored cannot be stored according to the address information. In order to store the data to be stored to the undamaged disk, the address information of the data to be stored can be determined again, and the step 2 is executed again until the data to be stored is stored to the undamaged disk.

After storing the data to be stored, it can be further determined whether the parity block needs to be calculated according to the first stripe storage mode. When the first stripe storage mode indicates that a parity block exists in a stripe, that is, when the stripe has redundancy protection, parity block data can be calculated from the stored data block after storing each data block in the stripe, and stored to an undamaged disk. Alternatively, when determining each data block of a stripe, calculating parity block data according to the determined each data block of the stripe, and storing both the data block and the parity block data of each data block of the stripe to an undamaged disk.

When the parity block data is stored to the undamaged disk, the address information of the parity block data can be determined, whether the disk corresponding to the address information belongs to the undamaged disk or not is judged, and if the disk corresponding to the address information is the undamaged disk, the parity block data is stored according to the address information; if the disk corresponding to the address information is not the undamaged disk, the address information of the parity block data is re-determined, and the execution is returned to judge whether the disk corresponding to the address information belongs to the undamaged disk or not until the parity block data is stored to the undamaged disk. The logical address of the parity block data and the logical address of the data block in the same stripe can be discontinuous or continuous.

To sum up, in this embodiment, it can be determined whether the address information of the data to be stored points to the damaged disk according to a decision result of whether the disk corresponding to the address information is the damaged disk. When the address information of the data to be stored points to the undamaged disk, storing the data to be stored; and when the data to be stored points to the damaged disk, re-determining the address information of the data to be stored. Therefore, the data to be stored can be accurately stored to the undamaged disk.

In another embodiment of the present application, in step S401, when determining the first stripe storage mode according to the number of undamaged disks, it can specifically include the following implementation:

determining the first stripe storage mode with redundancy protection when the number of the undamaged disks is larger than a preset number threshold value.

determining the first stripe storage mode without redundancy protection when the number of the undamaged disks is not larger than the preset number threshold.

The stripe storage mode with redundancy protection can be understood as a stripe storage mode including parity blocks. Under the stripe storage mode with redundancy protection, when the number of the damaged disks is less than the specified number, the damaged data can be recovered according to the undamaged data (including the parity block data and the data block), and the safety of the stored data can be improved. Therefore, the arrangement of the parity block can improve the safety of data.

The preset number threshold can be a numerical value preset according to user requirement. For example, the preset number threshold can be 3 or other values.

The stripe storage mode without redundancy protection can be understood as a stripe storage mode that does not contain parity blocks. When the number of the undamaged disks is small, in order to fully utilize the disk space, the stripe storage mode without redundancy protection can be adopted to store data, so that the storage space on the undamaged disks can be utilized to the maximum extent.

For example, when the number of undamaged disks is 3, stripe storage mode 3+0 without redundancy protection can be adopted. When the number of undamaged disks is 4, stripe storage mode 3+1 with redundancy protection can be adopted.

The storage space in the disk can be divided into a P-zone and a D-zone, where the P-zone is used for storing the parity block and the D-zone is used for storing the data block. For example, referring to FIG. 2a, the letter D represents the storage space of the data block and the letter P represents the storage space of the parity block. Under the stripe storage mode without redundancy protection, the P-zone and the D-zone on the undamaged disk can both store data, and the storage space of the disk is fully utilized.

In another embodiment of the present application, in the embodiment shown in FIG. 4, the data to be stored includes at least one data block, and when the data to be stored is video data, the data amount of the data block can be: N times or 1/N of GOP size of video data corresponding to data to be stored, wherein N is a positive integer.

When the data amount of the data block is 1/N of the size of the complete GOP of the video data corresponding to the data to be stored, each complete GOP data can be stored in a continuous data block. The contiguous data blocks can be understood as contiguous data blocks in the same stripe, and can also be understood as contiguous data blocks in contiguous stripes.

When the data amount of the data block is N times of the size of the complete GOP of the video data corresponding to the data to be stored, each data block contains complete GOP data. In this case, the data block stored to the undamaged disk can be played.

When the data amount of the data block is 1/N of the size of the complete GOP of the video data corresponding to the data to be stored, since one complete GOP data is distributed in N contiguous data blocks, the possibility that all data blocks in the N contiguous data blocks are distributed on an undamaged disk is increased, so that the data amount of playable data in the stored data can be increased when the ultra-redundant bad disk occurs again.

In this embodiment, each data block and parity block in the stripe can be stored on different disks. When the ultra-redundant bad disk occurs again, the risk of losing the whole video can be reduced, and the continuity of the playable data can be improved as much as possible.

When each data block and parity block in the stripe are stored on different disks, the obtained data may be discontinuous when playing the current data, and a frame skipping phenomenon exists. The frame skipping interval can be large or small.

The larger the data amount of the data block is, the larger the frame skipping interval during data playback is. When the data amount of the data block is small, the frame skipping interval during data playback is small. Therefore, the data amount of the data block can be set according to user requirement.

To sum up, in this embodiment, by setting the data amount of the data block to be N times or 1/N of the size of the complete GOP of the video data corresponding to the data to be stored, the data amount of the playable data in the stored data can be increased when the ultra-redundant bad disc occurs.

The present application will be described in detail with reference to specific examples.

In the example shown in FIG. 2b, the CHUNK space management unit is also used for configuring the first stripe storage mode when more than a specified number of disks are detected to be damaged. Configuring the first stripe storage mode can include configuring data amount of the data block and selecting either configurable item 1 or configurable item 2 when the ultra-redundant bad disc occurs. When configurable item 1 is selected, it means that the configuration has no redundancy protection, i.e. the stripe does not contain parity blocks, and all zones in the undamaged disk (e.g. including the D-zone and the P-zone in FIG. 2 a) can be written with data, which can increase the amount of data that can be written. When the configurable item 2 is selected, it means that protection to be redundant is configured, that is, the stripe contains a parity block, and both the data block and the parity block are stored for the damaged disk, so that protection of data can be improved, and data loss can be avoided as much as possible.

After determining the logical address of data block included in the data to be stored, the video service unit sends a data storage request to the RAID management unit, where the data storage request carries the logical address of the data block. When the CHUNK space management unit in the RAID management unit receives the data storage request sent by the video service unit, it determines a physical address mapped by a logical address of each data block, judge whether a disk corresponding to the physical address is a damaged disk or not, and if a disk corresponding to the physical address is a damaged disk, returning an invalid message to the video service unit; and if a disk corresponding to the physical address is not a damaged disk, sending the data block and the corresponding physical address to the IO processing unit. And when receiving the data block and the physical address, the IO processing unit stores the data block into the disk storage space corresponding to the physical address.

When the video service unit receives the invalid message sent by the RAID management unit, it can re-determine the logical address of the data block and send the data storage request to the RAID management unit again until the data block is stored in the undamaged disk.

The data obtaining method and the data storage process according to this embodiment do not limit the version of the redundant array of independent disks, and can be applied to, for example, versions with redundancy protection such as RAID1, RAID5, RAID6, and RAID10; it is also applicable to a RAID without redundancy protection, such as RAID0. This embodiment is still applicable to newly generated RAID types that can have more than 2 bad disks in redundancy (e.g., RAID2.0, EC-RAID). A RAID with redundancy exceeding 2 bad disks can be understood as a RAID in which m in the stripe storage mode (n+m) is a value of 2 or more.

Figure 5:
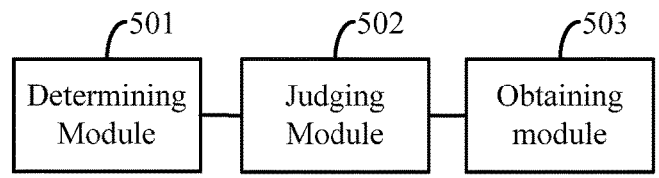
FIG. 5 is a schematic structural diagram of a data obtaining apparatus according to an embodiment of the present application.

FIG. 5 is a schematic structural diagram of a data obtaining apparatus according to an embodiment of the present application. The embodiment is applied to electronic device. This embodiment corresponds to the method embodiment shown in FIG. 1, and the apparatus embodiment includes:

a determining module 501 for determining address information of data to be obtained;

a judging module 502 for judging whether the disk corresponding to the address information of the data to be obtained is a damaged disk or not;

an obtaining module 503 for obtaining the data to be obtained according to the address information of the data to be obtained to obtain current data when the disk corresponding to the address information of the data to be obtained is not a damaged disk;

the determining module 501 is further used to determine address information of the next data to be obtained and trigger the judging module 502 when the disk corresponding to the address information of the data to be obtained is a damaged disk.

In another embodiment of the present application, the obtaining module 503 in the embodiment shown in FIG. 5 is specifically used for:

obtaining data block corresponding to the address information of the data to be obtained as current data.

In another embodiment of the present application, the judging module 502 in the embodiment shown in FIG. 5 is specifically used for:

determining a physical address mapped by the address information of the data to be obtained, judging whether the physical address is an address on the damaged disk or not, and if the physical address is an address on the damaged disk, determining that the disk corresponding to the address information of the data to be obtained is a damaged disk.

Figure 6:
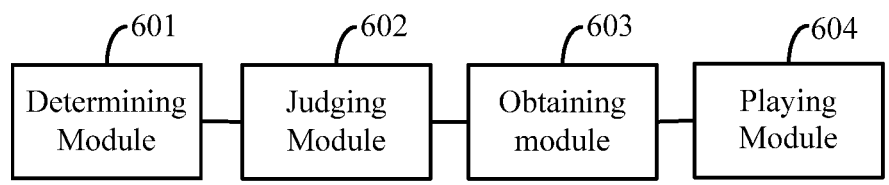
FIG. 6 is another schematic structural diagram of a data obtaining apparatus according to an embodiment of the present application.

In another embodiment of the present application, when the data to be obtained is video data, the embodiment shown in FIG. 6 can be obtained on the basis of the embodiment shown in FIG. 5. FIG. 6 is another schematic structural diagram of a data obtaining method according to an embodiment of the present application. The embodiment shown in FIG. 6 corresponds to the method embodiment shown in FIG. 3. The embodiment includes: a determining module 601, a judging module 602, an obtaining module 603 and a playing module 604. The determining module 601, the judging module 602, and the obtaining module 603 are respectively the same as the determining module 501, the judging module 502, and the obtaining module 503 in the embodiment shown in FIG. 5, and specific descriptions refer to the embodiment shown in FIG. 5, which is not described again in this embodiment.

The playing module 604 is used for playing the current data after obtaining the current data.

In another embodiment of the present application, the playing module 604 in the embodiment shown in FIG. 6 is specifically used for:

adding the current data into the data to be played;

playing an I-frame when the data to be played includes the I-frame;

playing the I-frame and other frames that need to be analyzed depending on the I-frame when the data to be played includes the I-frame and the other frames.

In another embodiment of the present application, the determining module 601 in the embodiment shown in FIG. 6 is specifically used for:

determining address information of data to be obtained in the unit of complete GOP of video data.

The playing module 604 is specifically used for:

playing an I-frame when the current data includes the I-frame;

playing the I-frame and other frames that need to be analyzed depending on the I-frame when the current data includes the I-frame and the other frames.

In another embodiment of the present application, in the embodiment shown in FIG. 6, the data to be obtained includes at least one data block; when the data to be obtained is video data, the data amount of the data block is: N times or 1/N the size of the complete GOP of the video data corresponding to the data to be obtained, wherein N is a positive integer.

In another embodiment of the present application, the apparatus can further include a storage module (not shown in the figure). This embodiment corresponds to the method embodiment described in FIG. 4.

The obtaining module 503 is further used for obtaining the number of undamaged disks when it is detected that there are more than a preset specified number of damaged disks.

The determining module 501 is further used for determining the first stripe storage mode according to the number of the undamaged disks; the first stripe storage mode is different from the second stripe storage mode, and the second stripe storage mode is a storage mode adopted when no damaged disk is detected.

The storage module is used for storing the data to be stored to the undamaged disk according to the first stripe storage mode when the data to be stored is obtained.

In another embodiment of the present application, the storage module is specifically used for:

determining address information of the data to be stored according to the first stripe storage mode;

judging whether the disk corresponding to the address information of the data to be stored belongs to the undamaged disks or not;

if the disk corresponding to the address information of the data to be stored is the undamaged disk, storing the data to be stored according to the address information of the data to be stored;

if the disk corresponding to the address information of the data to be stored is not the undamaged disk, re-determining the address information of the data to be stored, and executing the step of judging whether the disk corresponding to the address information of the data to be stored belongs to the undamaged disks or not.

In another embodiment of the present application, the determining module 501 is specifically used for:

determining the first stripe storage mode with redundancy protection, when the number of the undamaged disks is larger than a preset number threshold, determining the first stripe storage mode without redundancy protection when the number of the undamaged disks is not larger than the preset number threshold.

In another embodiment of the present application, the data to be stored includes at least one data block; when the data to be stored is video data, the data amount of the data block is: N times or 1/N of the size of the complete GOP of the video data corresponding to the data to be stored, wherein N is a positive integer.

Since the apparatus embodiment is obtained based on the method embodiment and has the same technical effect as the method, the technical effect of the apparatus embodiment is not described herein again. For the apparatus embodiment, since it is substantially similar to the method embodiment, it is described relatively simply, and for related parts, please refer to the part of the description of the method embodiment.

Figure 7:
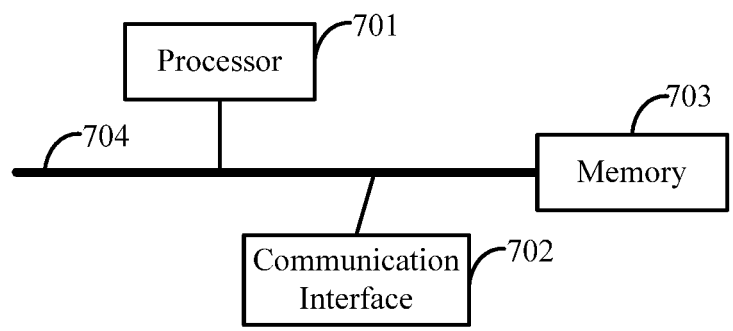
FIG. 7 is a schematic structural diagram of an electronic device according to an embodiment of the present application.

FIG. 7 is a schematic structural diagram of an electronic device according to an embodiment of the present application. The electronic device includes a processor 701, a communication interface 702, a memory 703 and a communication bus 704, wherein the processor 701, the communication interface 702 and the memory 703 are communicated with each other through the communication bus 704;

The memory 703 is used for storing a computer program;

The processor 701 is used for implementing the data obtaining method according to the embodiment of this application when executing the program stored in the memory 703. The data obtaining method includes:

determining address information of data to be obtained;

judging whether the disk corresponding to the address information of the data to be obtained is a damaged disk or not;

if the disk corresponding to the address information of the data to be obtained is not a damaged disk, obtaining the data to be obtained according to the address information of the data to be obtained to obtain current data;

if the disk corresponding to the address information of the data to be obtained is a damaged disk, determining the address information of the next data to be obtained, and returning to the step of judging whether a disk corresponding to the address information of the data to be obtained is a damaged disk or not.

The communication bus mentioned in the electronic device can be a Peripheral Component Interconnect (PCI) bus, an Extended Industry Standard Architecture (EISA) bus, or the like. The communication bus can be divided into an address bus, a data bus, a control bus, etc. For ease of illustration, only one thick line is shown, but this is not intended to represent only one bus or type of bus.

The communication interface is used for communication between the electronic device and other device.

The Memory can include a Random Access Memory (RAM) or a Non-Volatile Memory (NVM), such as at least one disk Memory. Alternatively, the memory can be at least one memory device located away from the aforementioned processor.

The Processor can be a general-purpose Processor, including a Central Processing Unit (CPU), a Network Processor (NP), and the like; it can also be Digital Signal Processors (DSPs), Application Specific Integrated Circuits (ASICs), Field Programmable Gate Arrays (FPGAs) or other Programmable logic devices, discrete Gate or transistor logic devices, discrete hardware components.

In summary, in this embodiment, it can be determined whether the data to be obtained is stored in the damaged disk or stored in the undamaged disk according to a decision result of whether the disk corresponding to the address information of the data to be obtained is a damaged disk or not. When the ultra-redundant bad disk occurs, the data on the damaged disk is damaged and cannot be obtained, and the data on the undamaged disk is still intact. When the data to be obtained is stored in the undamaged disk, the data to be obtained can be obtained according to the address information of the data to be obtained, and further the undamaged data in the disk array can be obtained when the ultra-redundant damaged disk occurs.

An embodiment of the present application provides a computer-readable storage medium, where a computer program is stored in the computer-readable storage medium, and when the computer program is executed by a processor, the computer program implements the data obtaining method according to the embodiment of the present application. The data obtaining method includes:

determining address information of data to be obtained;

judging whether the disk corresponding to the address information of the data to be obtained is a damaged disk or not;

if the disk corresponding to the address information of the data to be obtained is not a damaged disk, obtaining the data to be obtained according to the address information of the data to be obtained to obtain current data;

if the disk corresponding to the address information of the data to be obtained is a damaged disk, determining the address information of the next data to be obtained, and returning to the step of judging whether the disk corresponding to the address information of the data to be obtained is the damaged disk or not.

In summary, in this embodiment, it can be determined whether the data to be obtained is stored in the damaged disk or stored in the undamaged disk according to a decision result of whether the disk corresponding to the address information of the data to be obtained is the damaged disk or not. When the ultra-redundant bad disk occurs, the data on the damaged disk is damaged and cannot be obtained, and the data on the undamaged disk is still intact. When the data to be obtained is stored in the undamaged disk, the data to be obtained can be obtained according to the address information of the data to be obtained, and further the undamaged data in the disk array can be obtained when the ultra-redundant damaged disk occurs.

An embodiment of the present application further provide an executable program code, where the executable program code is configured to be executed to perform any one of the above data obtaining methods. The data obtaining method includes:

determining address information of data to be obtained;

judging whether the disk corresponding to the address information of the data to be obtained is a damaged disk or not;

if the disk corresponding to the address information of the data to be obtained is not a damaged disk, obtaining the data to be obtained according to the address information of the data to be obtained to obtain current data;

if the disk corresponding to the address information of the data to be obtained is a damaged disk, determining the address information of the next data to be obtained, and returning to the step of judging whether the disk corresponding to the address information of the data to be obtained is the damaged disk or not.

It should be noted that, in this document, relational terms such as first and second, and the like are used only to distinguish one entity or action from another entity or action without necessarily requiring or implying any actual such relationship or order between such entities or actions. Also, the terms "includes," "including," or any other variation thereof, are intended to cover a non-exclusive inclusion, such that a process, method, article, or device that includes a list of elements does not include only those elements but can include other elements not expressly listed or inherent to such process, method, article, or device. Without further limitation, an element defined by the phrase "including an . . . " does not exclude the presence of other identical elements in the process, method, article, or apparatus that includes the element.

All embodiments in the present description are described in a related manner, and the same and similar parts among the embodiments can be referred to each other, and each embodiment focuses on differences from other embodiments. In particular, apparatus embodiment, electronic device embodiment, computer-readable storage medium embodiment, and executable program code embodiment are described in relative terms that are substantially similar to method embodiment, and the relevant parts can be referred to the part of the description of the method embodiment.

The above description are only preferred embodiments of the present application and should not be taken as limiting the present application, and any modifications, equivalents, improvements and the like made within the spirit and principle of the present application should be included in the protection scope of the present application.

What is claimed is:

1. A method for obtaining data from disks when an ultra-redundant bad disk occurs, wherein the method comprises:

determining address information of data to be obtained stored in a disk;

judging whether a disk corresponding to the address information of the data to be obtained stored in a disk is a damaged disk or not;

if the disk corresponding to the address information of the data to be obtained stored in a disk is not a damaged disk, obtaining the data to be obtained stored in a disk according to the address information of the data to be obtained stored in a disk to obtain current data;

if the disk corresponding to the address information of the data to be obtained stored in a disk is a damaged disk, determining address information of next data to be obtained stored in a disk, and returning to the step of judging whether a disk corresponding to the address information of the data to be obtained stored in a disk is a damaged disk or not.

2. The method according to claim 1, wherein when the data to be obtained comprises at least one data block, the step of obtaining the data to be obtained according to the address information of the data to be obtained comprises:

obtaining the data block corresponding to the address information of the data to be obtained as current data.

3. The method according to claim 1, wherein the step of judging whether a disk corresponding to the address information of the data to be obtained is a damaged disk or not comprises:

determining a physical address mapped by the address information of the data to be obtained, and judging whether the physical address is an address on the damaged disk or not, and if the physical address is an address on the damaged disk, determining that the disk corresponding to the address information of the data to be obtained is a damaged disk.

4. The method according to claim 1, wherein the data to be obtained is video data; after obtaining the current data, the method further comprises:

playing the current data.

5. The method according to claim 4, wherein the step of determining address information of data to be obtained comprises:

determining address information of data to be obtained in a unit of complete GOP of video data;

the step of playing the current data comprises:

playing an I-frame when the current data comprises the I-frame;

playing the I-frame and other frames that need to be analyzed depending on the I-frame when the current data comprises the I-frame and the other frames.

6. The method according to claim 4, wherein the data to be obtained comprises at least one data block; when the data to be obtained is video data, the data amount of the data block is: N times or 1/N a size of the complete GOP of the video data corresponding to the data to be obtained, wherein N is a positive integer.

7. The method according to claim 1, wherein the step of playing the current data comprises:

adding the current data into data to be played;

playing an I-frame when the data to be played comprises the I-frame;

playing the I-frame and other frames that need to be analyzed depending on the I-frame when the data to be played comprises the I-frame and the other frames.

8. The method according to claim 1, wherein when it is detected that there are more than a preset specified number of damaged disks, the method further comprises:

obtaining the number of undamaged disks, and determining a first stripe storage mode according to the number of the undamaged disks; the first stripe storage mode is different from a second stripe storage mode, and the second stripe storage mode is a storage mode adopted when no damaged disk is detected;

storing data to be stored to the undamaged disks according to the first stripe storage mode when the data to be stored is obtained.

9. The method according to claim 8, wherein the step of storing data to be stored to the undamaged disks according to the first stripe storage mode comprises:
- determining address information of the data to be stored according to the first stripe storage mode;
- judging whether a disk corresponding to the address information of the data to be stored belongs to the undamaged disks or not;
- if the disk corresponding to the address information of the data to be stored belongs to the undamaged disks, storing the data to be stored according to the address information of the data to be stored;
- if the disk corresponding to the address information of the data to be stored is not the undamaged disks, re-determining the address information of the data to be stored, and returning to execute the step of judging whether the disk corresponding to the address information of the data to be stored belongs to the undamaged disks or not; or
- wherein the step of determining a first stripe storage mode according to the number of the undamaged disks comprises:
  - determining the first stripe storage mode with redundancy protection when the number of the undamaged disks is larger than a preset number threshold,
  - determining the first stripe storage mode without redundancy protection when the number of the undamaged disks is not larger than the preset number threshold.

10. The method according to claim 8, wherein the data to be stored comprises at least one data block; when the data to be stored is video data, the data amount of the data block is: N times or 1/N of the size of the complete GOP of the video data corresponding to the data to be stored, wherein N is a positive integer.

11. An apparatus for obtaining data from disks when an ultra-redundant bad disk occurs, wherein the apparatus comprises:
- a determining module for determining address information of data to be obtained stored in a disk;
- a judging module for judging whether a disk corresponding to the address information of the data to be obtained stored in a disk is a damaged disk or not;
- an obtaining module for obtaining the data to be obtained stored in a disk according to the address information of the data to be obtained stored in a disk to obtain current data when the disk corresponding to the address information of the data to be obtained stored in a disk is not a damaged disk;
- the determining module is further used to determine address information of next data to be obtained stored in a disk and trigger the judging module when the disk corresponding to the address information of the data to be obtained stored in a disk is a damaged disk.

12. The apparatus according to claim 11, wherein the data to be obtained is video data;
the apparatus further comprises:
a playing module for playing the current data after the current data is obtained.

13. The apparatus according to claim 12, wherein the determining module is specifically used for:
- determining address information of data to be obtained in a unit of complete GOP of video data;
the playing module is specifically used for:
- playing an I-frame when the current data comprises the I-frame;
- playing the I-frame and other frames that need to be analyzed depending on the I-frame when the current data comprises the I-frames and the other frames.

14. The apparatus according to claim 12, wherein the data to be obtained comprises at least one data block; when the data to be obtained is video data, the data amount of the data block is: N times or 1/N a size of the complete GOP of the video data corresponding to the data to be obtained, wherein N is a positive integer.

15. The apparatus according to claim 12, wherein the playing module is specifically used for:
- adding the current data into data to be played;
- playing an I-frame when the data to be played comprises the I-frame;
- playing the I-frame and other frames that need to be analyzed depending on the I-frame when the data to be played comprises the I-frame and the other frames.

16. The apparatus according to claim 11, wherein the apparatus further comprises:
- a storage module;
  - the obtaining module is further used for obtaining the number of undamaged disks when it is detected that there are more than a preset specified number of damaged disks;
  - the determining module is further used to determine a first stripe storage mode according to the number of the undamaged disks; the first stripe storage mode is different from a second stripe storage mode, and the second stripe storage mode is a storage mode adopted when no damaged disk is detected;
  - the storage module is used for storing data to be stored to the undamaged disks according to the first stripe storage mode when the data to be stored is obtained.

17. The apparatus according to claim 16, wherein the storage module is specifically used for:
- determining address information of the data to be stored according to the first stripe storage mode;
- judging whether a disk corresponding to the address information of the data to be stored belongs to the undamaged disks or not;
- if the disk corresponding to the address information of the data to be stored belongs to the undamaged disks, storing the data to be stored according to the address information of the data to be stored;
- if the disk corresponding to the address information of the data to be stored is not the undamaged disks, re-determining the address information of the data to be stored, and judging whether the disk corresponding to the address information of the data to be stored belongs to the undamaged disks or not.

18. An electronic device, wherein the electronic device comprises: a processor, a communication interface, a memory and a communication bus, wherein the processor, the communication interface and the memory communicate with each other through the communication bus;
the memory is used for storing a computer program;
the processor is used for implementing the method steps of claim 1 when executing the program stored in the memory.

19. A non-transitory computer-readable storage medium, wherein a computer program is stored in the computer-readable storage medium, which computer program, when being executed by a processor, executes the method steps of the claim 1.

* * * * *